United States Patent
Bell

[15] 3,701,507
[45] Oct. 31, 1972

[54] REAR VIEW MIRROR ATTACHMENT FOR VEHICLES

[72] Inventor: Lee J. Bell, 1457 Hazel, Saint Paul, Mich. 55119

[22] Filed: Oct. 12, 1970

[21] Appl. No.: 79,801

[52] U.S. Cl. .................248/467, 248/361, 248/362, 248/201, 350/307
[51] Int. Cl. .............................................B60r 1/06
[58] Field of Search..........248/49, 55, 467, 476, 479, 248/480; 350/307

[56] References Cited

UNITED STATES PATENTS 3,542,456  4/1968  Huge..........................350/307
3,305,202  2/1967  Christensen............248/480 X
1,581,755  4/1926  Meyer......................248/49 X Primary Examiner—William H. Schultz
Attorney—Robert M. Dunning

[57] ABSTRACT

An elongated bracket arm is supported in an pair of bearing brackets including bearings are mounted near opposite sides of a vehicle hood. The ends of the bracket arms are angularly bent relative to the axis of the bearing supported central position, and mirrors are adjustably supported at the ends of the bracket arm. The height of the mirrors may be adjusted by rotating the bracket arm in the bearings and clamping in adjusted position.

3 Claims, 5 Drawing Figures

PATENTED OCT 31 1972 3,701,507
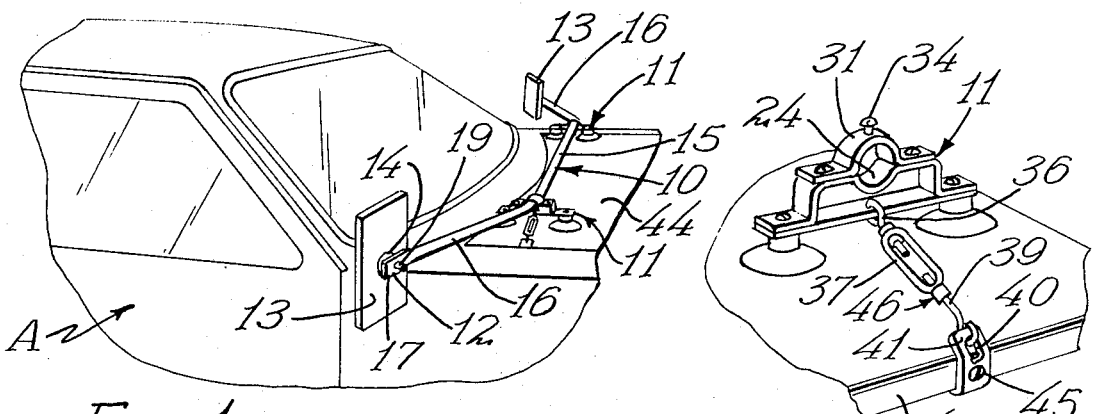
FIG. 1
FIG. 5
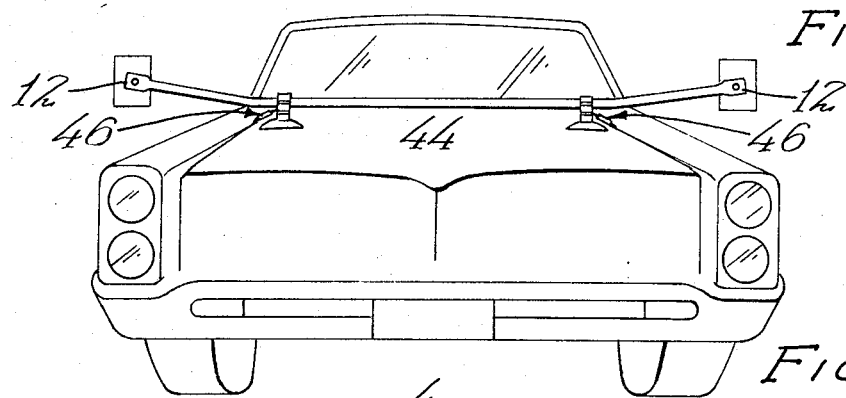
FIG. 2
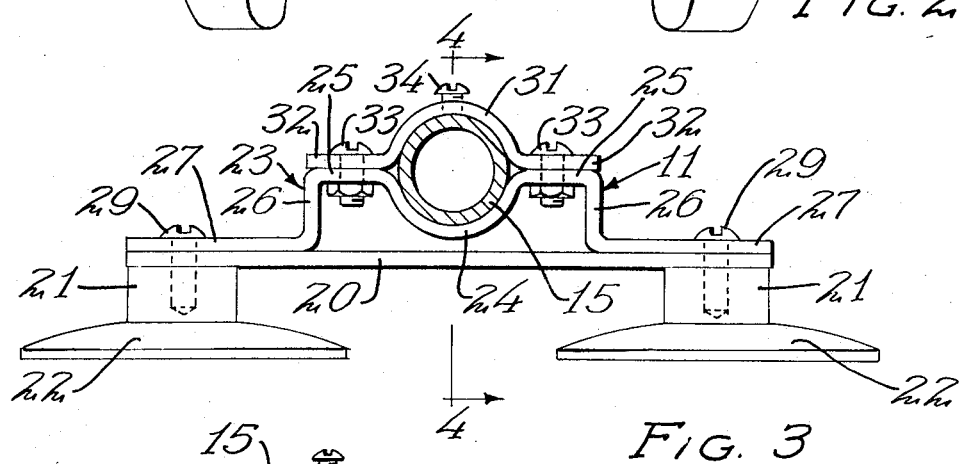
FIG. 3
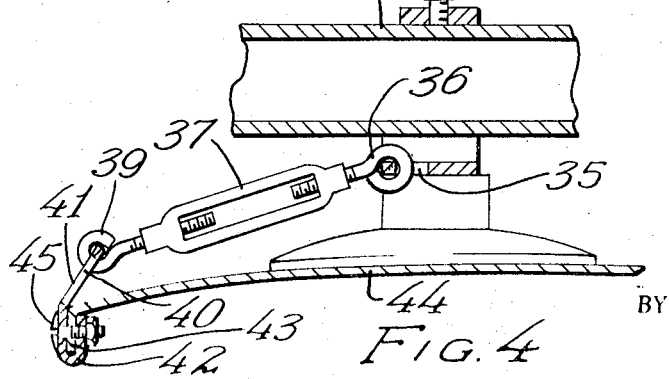
FIG. 4
INVENTOR
LEE J. BELL
BY Robert M. Dunning
ATTORNEY

REAR VIEW MIRROR ATTACHMENT FOR VEHICLES

This invention relates to an improvement in rear view mirror attachment for vehicles and deals particularly with a mirror support designed to provide a rear view on both sides of a motor vehicle.

BACKGROUND OF THE INVENTION

During recent years the production of campers, trailers and the like has very greatly increased. When a camper is carried in a pickup truck, or a trailer is being towed behind an automobile or truck, the conventional rear view mirror which provides a view through the rear window of the vehicle is of little or no value. In view of the width of such campers and trailers, from a safety standpoint it is necessary to have rearview mirrors properly located so that a clear view of following traffic is available from either side of the camper or trailer. This normally requires separate brackets mounted on opposite sides of the car, which adds materially to the cost of installation.

The brackets which support rear view mirrors are used on vehicles bearing campers or hauling trailers must extend well to the sides of the vehicle in order to be effective. As a result, such mirrors are normally awkward in appearance, and are particularly disadvantageous when the camper or trailer is not being carried or pulled. When the trailer is disconnected, the mirrors project to such an extent that they present somewhat of a hazard in parking lots and the like. Due to the fact that the supporting brackets must be securely fastened to the vehicle body, they are usually time consuming to disconnect. In some instances, the mirrors have been mounted upon pivotal supports or telescopic arms so that they can be retracted when not in use. In such a case, some time is required to readjust the mirror when the trailer is again attached, and such adjustment is difficult, particularly by one person, as it is necessary to adjust both mirrors so that they will provide the proper reflection for a driver sitting the the driver's seat.

SUMMARY OF THE INVENTION

An object of the invention resides in the provision of a simple rear view mirror bracket which extends across the hood of the vehicle and projects from opposite sides thereof. A rear view mirror is adjustably supported at each end of this bracket arm. The bracket arm is supported completely by the vehicle hood in such a manner that it will not interfere with the opening of the hood, and will remain in adjusted position when the hood is closed.

A feature of the present invention resides in the simple manner in which the rear view mirrors may be adjusted. The bracket arm includes a straight central section and angularly related end portions which support the mirrors. The straight central section is mounted in a pair of aligned supporting bearings so that the bracket arm may rotate about the axis of the straight central section. The arrangement is such that by rotating the bracket about its axis, the mirrors can be simultaneously raised and lowered so as to be at the proper level for the driver.

A further feature of the present invention resides in the simplicity with which the mirror bracket may be connected to and disconnected from the hood of the vehicle. The two bearings which are located on the opposite sides of the hood are supported by supporting brackets which may be secured to the surface of the hood by a pair of suction cups. When the mounting brackets are in place, they are connected to opposite side edges of the hood by adjustable connecting link means which securely hold the mounting brackets in fixed relation.

The mounting or bearing brackets which support the bearings in which the bracket arm is supported are preferably connected to the adjacent side edges of the hood by adjustable means including a turnbuckle which maybe tightened to hold the mounting brackets in position is fixed relation on the hood. Preferably the flexible connecting means is anchored to the side edges of the hood by bolts which extend through portions of the hood which are normally concealed from view. The entire apparatus may be removed when desired by merely removing these two bolts.

These and other objects and novel features of the present invention will be more clearly and fully set forth in the following specification and claims.

BRIEF DESCRIPTION OF THE DRAWINGS

FIG. 1. is a perspective view of the windshield area of a motor vehicle showing the rear view mirrors in place thereupon.

FIG. 2 is a front elevational view of the vehicle showing the manner in which the rear view mirrors extend laterally from the car so as to see the road behind the camper or trailer being towed or carried thereby.

FIG. 3 is a side elevational view of one of the mounting or bearing supporting brackets for supporting the rear view mirror bracket arm.

FIG. 4 is a vertical sectional view through the mounting bracket, the position of the section being indicated by the line 5—5 of FIG. 3.

FIG. 5 is a perspective detail showing the manner in which one of the mounting brackets is secured to the hood of the vehicle.

DESCRIPTION OF THE PREFERRED EMBODIMENT

The vehicle shown in the present application is indicated in general by the letter A, and is shown as comprising a passenger automobile. Obviously, the vehicle could comprise a pickup truck or other such vehicle if a camper is involved rather than a towed trailer.

In general, the device includes an elongated bracket arm 10 supported by a pair of mounting or bearing supporting brackets 11. The end extremities 12 of the bracket arm 10 support rear view mirrors 13 through the medium of an adjustable joint 14. In view of the fact that ball and socket joints and similar adjustable attaching means are well known in the art, the detail of the connecting members 14 is not shown in the drawings.

The bracket arm 10 is preferably formed of an elongated bar or tubular member. The bracket arm 10 includes a straight central portion 15 which is of a length substantially equal to the width of the hood of the vehicle A. The bracket 10 includes angularly extending arms 16 which are normally at a substantially equal angle to the axis of the central portion 15. In other words, in one adjusted position, the central portion 15 of the bracket 10, as well as the angularly extending end portions 16, may be on a common horizontal plane. As will be later described, means are provided to pivotally adjust the central portion 15 of the bracket arm about its axis, resulting in the raising the lowering of the outer ends of the angularly extending portions 16. In the particular arrangement illustrated, the ends 17 of the angularly extending bracket arm portions 16 are flattened to accommodate fastening bolts such as 19 or other suitable means which connect the bracket arm to the connectors 14 supporting the mirrors 13.

The supporting brackets 11 are formed as is believed clearly illustrated in the drawings. An elongated base strip 20 is terminally connected to the central bosses 21 of a pair of suction cups 22. Also supported by the suction cups 22 is a bracket member 23 upon which the rear view mirror bracket arm 10 rests. The bracket 23 is provided with a substantially semi-cylindrical central portion 24 connected by a pair of outwardly extending coplanar bracket portions 25 to parallel downwardly extending legs 26 which terminate in opposed outwardly extending mounting portions 27. The mounting portions 27 rests in surface contact with the end of the base strip 20, and attaching bolts 29 extend through the bracket portions 27 and the ends of the base bracket strip 20 and into the suction cup bosses 21 to hold these parts assembled.

A substantially semi-cylindrical bracket portion 31 is provided in opposed relation to the semi-cylindrical portion 24, and is provide with outwardly extending opposed ears 32 which are designed to rest upon the outwardly extending portions 25 of the bracket 23. Bolts 23 clamp the upper bracket portion 31 to the lower bracket portion 23. The two opposed semi-circular portions 24 and 31 of each bracket serve as a bearing for the straight central portion 15 of the mirror supporting bracket arm 10. A set screw 34 or other suitable anchoring means is designed to hold the bracket arm 10 in adjusted relation relative to the supporting brackets 11.

The bracket base strip 20 is provided with a central aperture 35 which is designed to accommodate a screw eye such as 36 forming a part of a turnbuckle 37. A similar screw eye 39 at the other end of the turnbuckle 37 extends through an aperture 40 in an anchoring strap 41. The end of the anchoring strap 41 opposite that which is linked to the screw eye 39 is bent into U-shaped form as indicated at 42 in FIG. 5 of the drawings. The U-shaped strap end 42 forms a channel which accommodates the down turned side flange or edge 43 of the vehicle hood 44. A bolt 45 may be used to hold the strap 41 in fixed relation to the edge of the vehicle hood. As will be understood, a similar anchoring link means which is indicated in general by the numeral 46 and which includes the turnbuckle 37, the screw eyes 36 and 39, and the anchoring strap 41 may be anchored to the opposite edge of the vehicle hood.

Due to the fact that the anchoring straps 41 are attached to the edges of the vehicle hood 44, and the rear view mirror bracket arm is supported only by the vehicle hood 44, the entire rear view mirror structure will pivot in unison with the vehicle hood when it is opened for car servicing or the like. As will be later described, the rear view mirror bracket arm may be secured in an adjusted position, and the mirrors will normally return to their original positions when the hood is closed.

In attaching the rear view mirror structure to a vehicle, the bearing supporting brackets 11 may be secured to the transverse center portion 15 of the bracket arm 10 either before or after the supporting brackets 11 are attached to the car hood 44. The supporting brackets 11 are, in any event, adjusted so that the brackets are in a predetermined spaced relation from the side edge flanges 43 of the hood. When properly located, the suction cups 22 may be compressed to secure the mounting brackets to the hood surface. The anchoring straps 41 are positioned to engage the hood flanges 43 on opposite sides of the hood 44, and if desired, the U-shaped portion 42 of the strap 41 may be secured in place by a bolt 45.

Before tightening the set screws 34, the bracket arm 10 is loosely mounted in the bearings formed by the opposed semi-circular members 24 and 31, and the ends of the angularly extending arm portions 16 are adjusted to the proper height by pivotal movement of the central bracket portion 15 within the bearings. The set screws 34 may then be secured in place to hold the bearing supporting bracket in fixed relation to the bracket arm 10, and to hold the mirrors supporting arm ends 17 at a proper elevation so that the driver is provided with a clear view of the rear of the vehicle. The turnbuckles 37 may then be tightened to hold the supporting brackets from movement. The rear view mirrors 13 may then be adjusted so as to provide the vehicle driver with a clear view of traffic behind the towed trailer or the like.

If the structure is not to be used, the entire device may be removed by detaching the bolts 45. Alternatively, the upper semi-circular portions 31 of the supporting brackets may be removed and the bracket arm 10 removed and stored until it is again wanted. When replaced, the mirrors 13 may maintain their proper angularity to the supporting bracket arm, simplifying the replacing operation.

In accordance with the Patent Statutes, I have described the principles of construction and operation of my rear view mirror attachment for vehicles; and while I have endeavored to set forth the best embodiment thereof, I desire to have it understood that changes may be made within the scope of the following claims without departing from the spirit of my invention.

I claim:

1. A rear view mirror attachment for the hood of a motor vehicle including:
   an elongated bracket arm having a straight center section,
   a pair of bearing supporting brackets including aligned bearings pivotally supported in said bearings,
   means securing said bearing supporting brackets to the vehicle hood near opposite sides thereof,
   angularly inclined arm portions on the ends of said straight center section on said bracket arm outwardly of said bearing supporting brackets,
   rear view mirrors adjustably secured to the extremities of said bracket arm, and
   releasable means on said bearings for securing said bracket arm from pivotal motion relative to said bearings,
   said angularly inclined arm portions being in a substantially common plane through the axis of the portion of said bracket arm between said arm portions.

2. The structure of claim 1 and in which said supporting brackets include:
- a base strip,
- a bracket member including a central semi-cylindrical portion, outwardly extending coplanar bracket members on opposite sides of said central portion, downwardly extending legs on the outer ends of said coplanar bracket portions, and outwardly extending coplanar mounting portions in face contact with said base strip,
- a pair of suction cups beneath the ends of said base strip and forming said securing means,
- fastening means extending through said mounting portions, said base strip and into said suction cups,
- a semi-cylindrical bracket portion having at its ends opposed coplanar ears, said last named semi-cylindrical bracket portion lying in opposed relation to said central semi-cylindrical portion and combining therewith to form said bearings,
- means securing said ears to said first mentioned outwardly extending coplanar bracket members.

3. The structure of claim 2 and including adjustable means connecting each said base strip to an edge of said hood.

* * * * *